Patented Apr. 24, 1923.

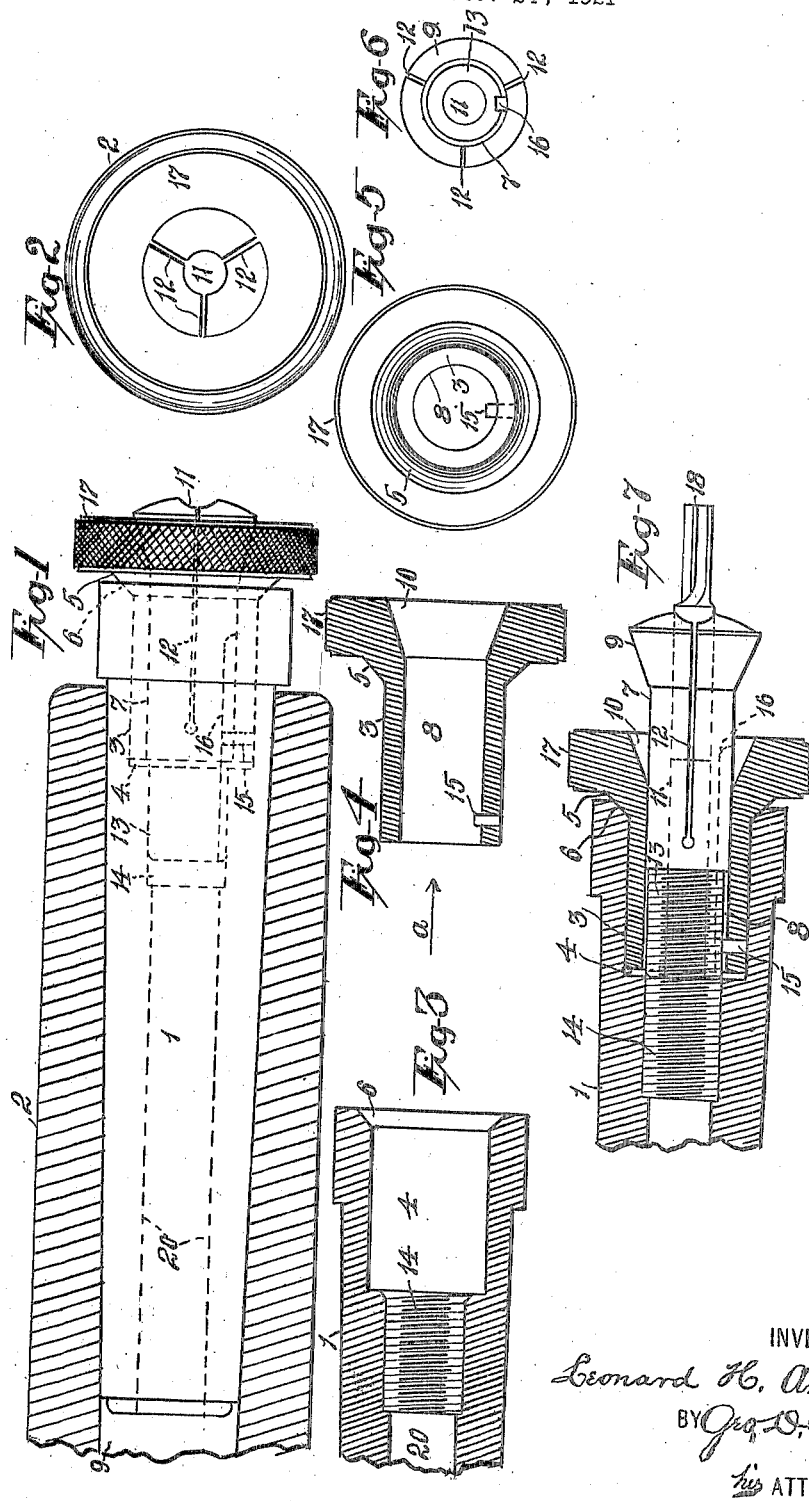

1,453,117

UNITED STATES PATENT OFFICE.

LEONARD H. ANDERSON, OF BRIDGEPORT, CONNECTICUT.

DRAW CHUCK ATTACHMENT.

Application filed February 24, 1921. Serial No. 447,431.

*To all whom it may concern:*

Be it known that I, LEONARD H. ANDERSON, citizen of the United States, residing at Bridgeport, in the county of Fairfield and State of Connecticut, have invented certain new and useful Improvements in Draw Chuck Attachments; and I do hereby declare the following to be a full, clear, and exact description of the invention, such as will enable others skilled in the art to which it appertains to make and use the same.

This invention relates to draw chuck attachments, adapted for use in connection with rotatable spindles and arbors of various machines. The chuck or collet alluded to is a tool in common use having a central bore for the reception of small working tools, and is split in part to give a spring effect so that, when its taper head is drawn into a correspondingly tapered seat, the split end of the chuck will firmly close about a tool mounted therein. The object of the present invention is to provide novel means for actuating the chuck to open and close from the front rather than from the rear.

Referring to the accompanying drawings wherein the figures and letters of reference indicate like parts throughout the several views:

Figure 1 represents a broken sectional view of a rotatable spindle with the chuck attachment mounted therein;

Figure 2 is a front elevation of Figure 1;

Figure 3 is a detail broken sectional view of the socket feature of the chuck attachment;

Figure 4 is a detail sectional view of the chuck holding member;

Figure 5 is a detail rear elevation of the chuck holding member looking in the direction of arrow *a*, Fig. 4;

Figure 6 is a detail rear elevation of the chuck, and

Figure 7 is a broken sectional view of the socket and chuck holding member, and full view of the chuck in position to be seated by the rotative action of the chuck holding member.

1 represents a taper socket or other like holder adapted to be inserted in the spindle 2 which may represent the rotatable center of various machines, such, for instance, as lathes, milling machines, &c. In Figure 4 is shown a shell or other like member having the straight cylindrical body 3 adapted to rotatably fit the recess or open mouth bearing 4 of the socket, and the beveled portion 5 adapted to register with its taper seat 6.

The chuck has the body portion 7 adapted to register with the bore 8 of the shell, and its taper head 9 with the tapered mouth 10 of said shell. The chuck has the opening 11 therethrough, and the kerfs 12 to give it a spring effect, and the threaded end 13 adapted to register with the female thread 14 of the socket. The shell is provided with the key 15 projecting into the bore 8 adapted to register with the keyway 16 of the chuck, seen more clearly in Figure 6.

The chuck and shell may be assembled together before they are inserted within the socket, or the shell may first be seated and the chuck may be entered, Figure 7, until its threaded end is in position to engage the threads 14 of the socket and also with its keyway registering with the key of the shell. Then the shell is rotated, by means of its knurled head 17, to engage the threads 13 and 14 and thus cause the chuck to be drawn in until fully seated in the shell, as shown in Figure 1. When the chuck is thus seated, a very slight rotation of the shell will draw the chuck inwardly and compress the spring end of the chuck to grip the cutting tool 18 temporarily inserted therein. The taper mouth 6 of the socket and the incline 5 of the shell form a locating seat or joint which will always preserve the central position of the shell and chuck with respect to the axis of the socket, so that said shell and chuck will always run true, a result not to be obtained were the inner face of the head 17 clamped against the outer end of the socket.

One of the advantages of locating the adjusting feature of the chuck at the outer end of the socket is that the chuck may also be utilized for holding rods of any length, which rods can extend through the central bore 19 of the spindle 2 and the bore 20 of the holder or socket 1.

The attachment requires no special form of chuck but is adapted to well known chuck constructions in common use.

Having thus described my invention what I claim is:—

A draw chuck attachment comprising a tapered socket member adapted to be inserted in the tapered mouth of a rotating spindle, said socket member having a recessed mouth to form a bearing and a reduced threaded opening extending inwardly therefrom, and a beveled seat at its outer end, a shell having a cylindrical body journaled in the socket bearing and a head portion to form means for rotating the shell, said shell having a bevel portion to register with the beveled seat of the socket and a flared mouth, combined with a tool holding spring chuck mounted in the shell having a threaded end engaging the threaded opening of the socket and a tapered head coöperating with said flared mouth, and means for rotatably connecting the chuck with the shell.

In testimony whereof I affix my signature.

LEONARD H. ANDERSON.